(12) United States Patent
Fukashiro et al.

(10) Patent No.: US 7,218,818 B2
(45) Date of Patent: May 15, 2007

(54) DISPERSION COMPENSATION DEVICE AND DISPERSION COMPENSATION METHOD

(75) Inventors: Yasuyuki Fukashiro, Yokohama (JP); Hiroyuki Nakano, Yokohama (JP); Tetsuya Uda, Yokohama (JP); Tooru Hirai, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 0 days.

(21) Appl. No.: 11/190,889

(22) Filed: Jul. 28, 2005

(65) Prior Publication Data

US 2006/0133815 A1    Jun. 22, 2006

(30) Foreign Application Priority Data

Dec. 27, 2004  (JP)  ............................. 2004-375729

(51) Int. Cl.
*G02B 6/34*   (2006.01)
*H04B 10/12*  (2006.01)

(52) U.S. Cl. ........................ 385/37; 385/27; 398/147

(58) Field of Classification Search ..................... None
See application file for complete search history.

(56) References Cited

U.S. PATENT DOCUMENTS

| 5,608,562 | A |   | 3/1997  | Delavaux et al. |
|-----------|---|---|---------|-----------------|
| 5,930,045 | A |   | 7/1999  | Shirasaki |
| 5,943,151 | A | * | 8/1999  | Grasso et al. ............... 398/147 |
| 6,647,180 | B2| * | 11/2003 | Rothenberg .................. 385/37 |

* cited by examiner

*Primary Examiner*—Frank G. Font
*Assistant Examiner*—Eric Wong
(74) *Attorney, Agent, or Firm*—Antonelli, Terry, Stout & Kraus, LLP.

(57) ABSTRACT

A dispersion compensating fiber whose chromatic dispersion is positive and a negative dispersion compensating fiber whose chromatic dispersion is negative are prepared, and division-multiplexed optical signals, after being guided to either dispersion compensating fiber to once shift the whole wavelength band to positivity or negativity, are subjected to fine adjustment with a dispersion compensating fiber of a reverse sign.

8 Claims, 8 Drawing Sheets

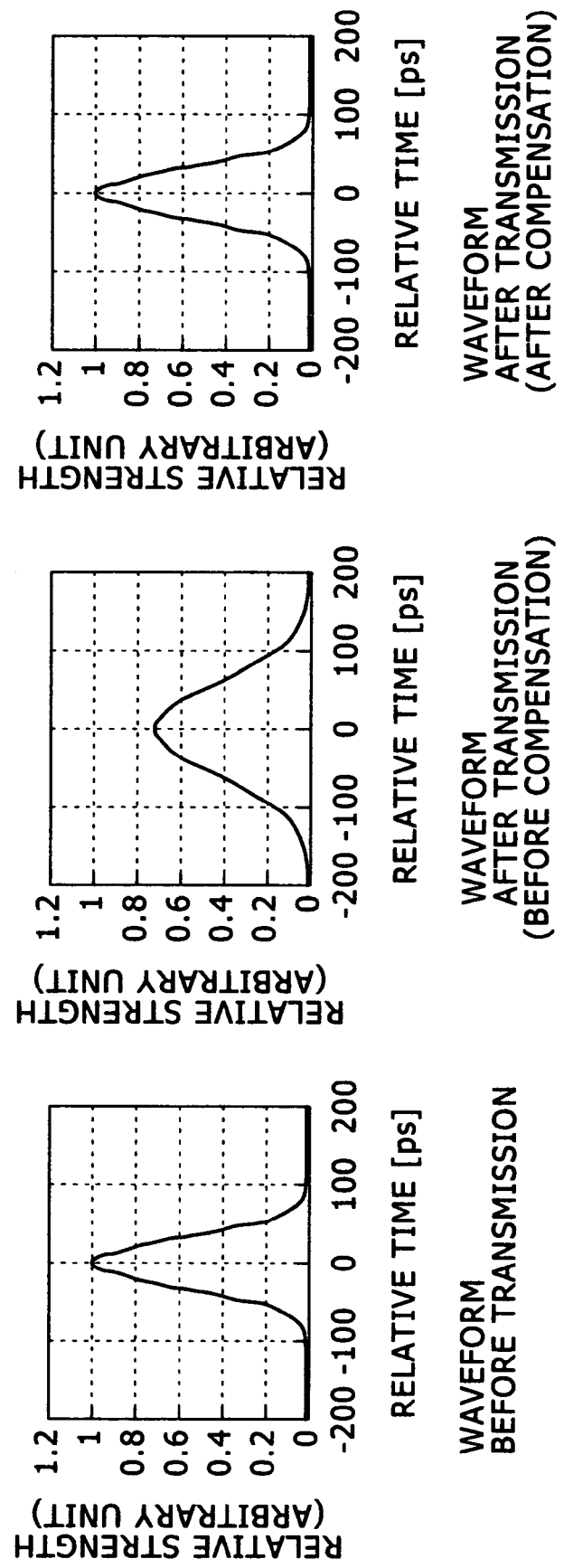

FIG. 6A

| SETTING 1 | DISPERSION COMPENSATION UNIT 1 | DISPERSION COMPENSATION UNIT 2 | DISPERSION COMPENSATION UNIT 3 | DISPERSION COMPENSATION UNIT 4 | DISPERSION COMPENSATION UNIT 5 |
|---|---|---|---|---|---|
| 61 — DISPERSION COMPENSATION QUANTITY OF EACH UNIT | 500 | -250 | -250 | -250 | -250 |
| 62 — OPTICAL SWITCH NO. TO BE CHANGED OVER TO MIRROR SIDE | 1 | 2 | 3 | 4 | 5 |
| 63 — TOTAL DISPERSION COMPENSATION QUANTITY IN MAIN SIGNAL OUTPUT UNIT | 1000 | 500 | 0 | -500 | -1000 |
| 64 — FIBER LENGTH (km) | 6.3 | 3.1 | 3.1 | 3.1 | 3.1 |
| 65 — TOTAL FIBER LENGTH (km) | 12.6 | 18.8 | 25.0 | 31.2 | 37.4 |

FIG. 6B

| SETTING 2 | DISPERSION COMPENSATION UNIT 1 | DISPERSION COMPENSATION UNIT 2 | DISPERSION COMPENSATION UNIT 3 | DISPERSION COMPENSATION UNIT 4 | DISPERSION COMPENSATION UNIT 5 |
|---|---|---|---|---|---|
| 61 — DISPERSION COMPENSATION QUANTITY OF EACH UNIT | -500 | 250 | 250 | 250 | 250 |
| 62 — OPTICAL SWITCH NO. TO BE CHANGED OVER TO MIRROR SIDE | 1 | 2 | 3 | 4 | 5 |
| 63 — TOTAL DISPERSION COMPENSATION QUANTITY IN MAIN SIGNAL OUTPUT UNIT | -1000 | -500 | 0 | 500 | 1000 |
| 64 — FIBER LENGTH (km) | 6.3 | 3.1 | 3.1 | 3.1 | 3.1 |
| 65 — TOTAL FIBER LENGTH (km) | 12.6 | 18.8 | 25.0 | 31.2 | 37.4 |

UNIT OF DISPERSION COMPENSATION QUANTITY : [ps/nm]

DISPERSION COMPENSATION DEVICE AND DISPERSION COMPENSATION METHOD

CROSS-REFERENCE TO RELATED APPLICATIONS

This application relates to Japanese patent application serial no. 2004-365893, filed on Dec. 17, 2004, entitled "Variable Dispersion Compensation Device, Optical Transmission System Using It and Method of Setting Dispersion Compensation Quantity" the content of which are incorporated herein by reference.

CLAIM OF PRIORITY

The present application claims priority from Japanese patent application serial no. 2004-375729, filed on Dec. 27, 2004, the content of which is hereby incorporated by reference into this application.

BACKGROUND OF THE INVENTION

1. Field of the Invention

The present invention relates to a dispersion compensation device and a dispersion compensation method, and more particularly to a dispersion compensation device and a dispersion compensation method permitting dispersion compensation for dispersion-shifted fibers.

2. Description of Related Art

When designing a wavelength division multiplexing (WDM) system which passes wavelength division-multiplexed signals over a single mode fiber (SMF) transmission line, it is necessary to apply dispersion compensating fibers (DCFs) to compensate for chromatic dispersion and chromatic dispersion slope. Since the chromatic dispersion of an SMF is about +20 ps/nm/km in a 1.55 µm communication band as shown in FIG. 1, the DCFs are selected out of fibers having negative chromatic dispersion of, for instance, −80 to −100 ps/nm/km.

Apart from them, there are also deployed dispersion-shifted fibers (DSFs) formed by shifting the zero-dispersion wavelength, which is 1.3 µm (micrometers) for SMFs, to 1.55 µm, which belongs to the communication band. Generally, DSFs were assumed to require no dispersion compensation, but their dispersion compensation has also come to be increasingly called for on account of such recent developments as the increase in transmission speed, extension of transmission distance, further densification of dense WDM (DWDM) and realization of transparent networks with no or little regeneration.

In determining the appropriate dispersion compensation quantity, the dispersion value on the optical fiber transmission line is actually measured or predicted, and DCFs of appropriate lengths are mounted on the transmission device. However, since this necessitates keeping many different kinds of DCFs in stock, there also is a keen requirement for variable dispersion compensation devices.

U.S. Pat. No. 5,930,045 (Patent Reference 1) describes a variable dispersion compensation device using a virtual image phase array (VIPA). U.S. Pat. No. 5,608,562 (Patent Reference 2) describes a variable dispersion compensation device using an optical circulator, plural optical switches, plural DCFs and a mirror.

The C-band used for communication in optical transmission ranges from 1530 to 1565 nm. The zero-dispersion wavelength of DSFs is 1.55 µm. This means that, when WDM transmission is to be done by using DSFs, lights of 1530 nm are subject to negative chromatic dispersion and lights of 1565 nm are subject to positive chromatic dispersion. DSFs are also subject to inevitable fluctuations in the manufacturing process, and therefore their zero-dispersion wavelength may differ from 1550 nm.

The VIPA described in Patent Reference 1 represents a technology that can provide both positive chromatic dispersion and negative chromatic dispersion, but it requires assembly of a complex optical system and accordingly is expensive.

The invention described in Patent Reference 2 is mainly composed of passive optical components. However, the optical switches used involve elements to make the configuration complex, including a large number of contacts, and accordingly may fail to maintain its reliability level. Since main signals pass every optical switch whether they travel past the DCFs or not, if the optical switches and the DCFs are unitized, the units cannot be detached or diverted to any other purpose. Thus, if the dispersion quantity is to be altered by remote control when any DCF is to be added, every optical switch that maybe added will have to be installed in advance, or if any optical switch is to be added or removed, main signal transmission should be suspended during the adding or removing work. Furthermore, Patent Reference 2 makes no mention of dispersion compensation on a transmission line using DSFs. Moreover, it has to be equipped with several kinds of DCFs.

In general terminology, DSF means a fiber whose chromatic dispersion falls off to zero in the vicinity of 1.55 µm, but similar fibers, which are non-zero dispersion compensating fibers (NZ-DSFs) having chromatic dispersion of a few ps/nm/km in the vicinity of 1.55 µm, are also used. These fibers may also pose the same problem. NZ-DSFs are also DSFs in a broader sense of the term.

SUMMARY OF THE INVENTION

An object of the present invention is to provide a dispersion compensation device and a dispersion compensation method permitting collective dispersion compensation of wavelength division-multiplexed optical signals having propagated over a transmission line involving such DSFs and other elements and permitting ready addition or removal of elements.

According to the invention, one end of a first fiber having a positive chromatic dispersion characteristic and one end of a second fiber having a negative chromatic dispersion characteristic are connected to each other, optical signals are inputted from another end of the first fiber, optical signals are outputted from another end of the second fiber, and chromatic dispersion of the optical signals is thereby compensated for.

Alternatively, optical signals may be inputted from the other end of the second fiber and outputted from the other end of the first fiber.

BRIEF DESCRIPTION OF THE DRAWINGS

Preferred embodiments of the present invention will now be described in conjunction with the accompanying drawings, in which:

FIGS. 4A–4C illustrate the effects of dispersion compensation;

FIGS. 6A and 6B illustrate the dispersion quantity and fiber length of a dispersion compensation unit in the preferred embodiment of the invention;

DETAILED DESCRIPTION OF THE PREFERRED EMBODIMENTS

Figure 5:
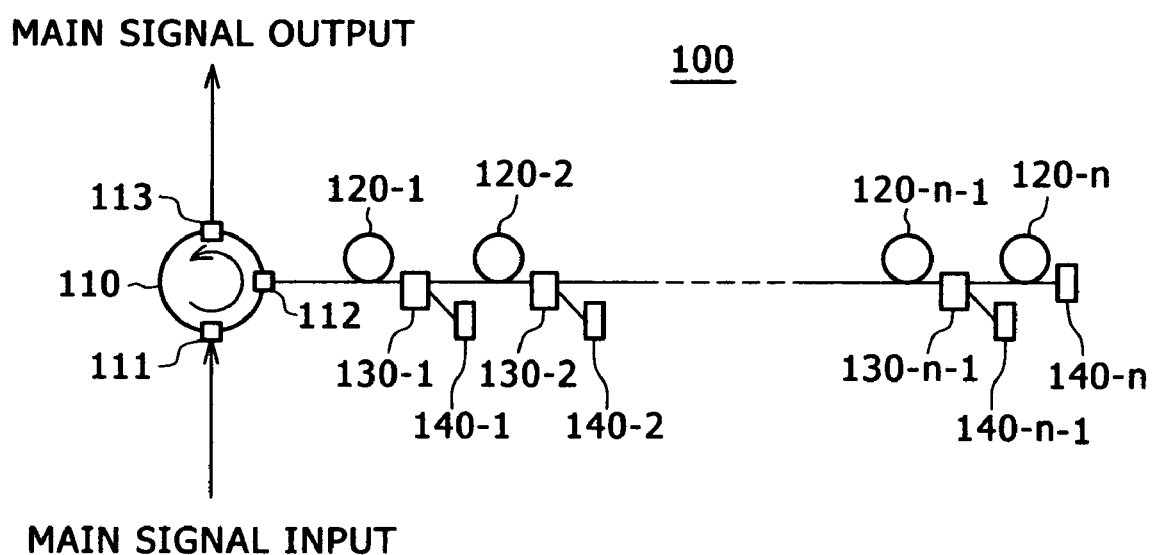
FIG. 5 is a block diagram of a variable dispersion compensation device, which is a preferred embodiment of the invention.
Figure 7:
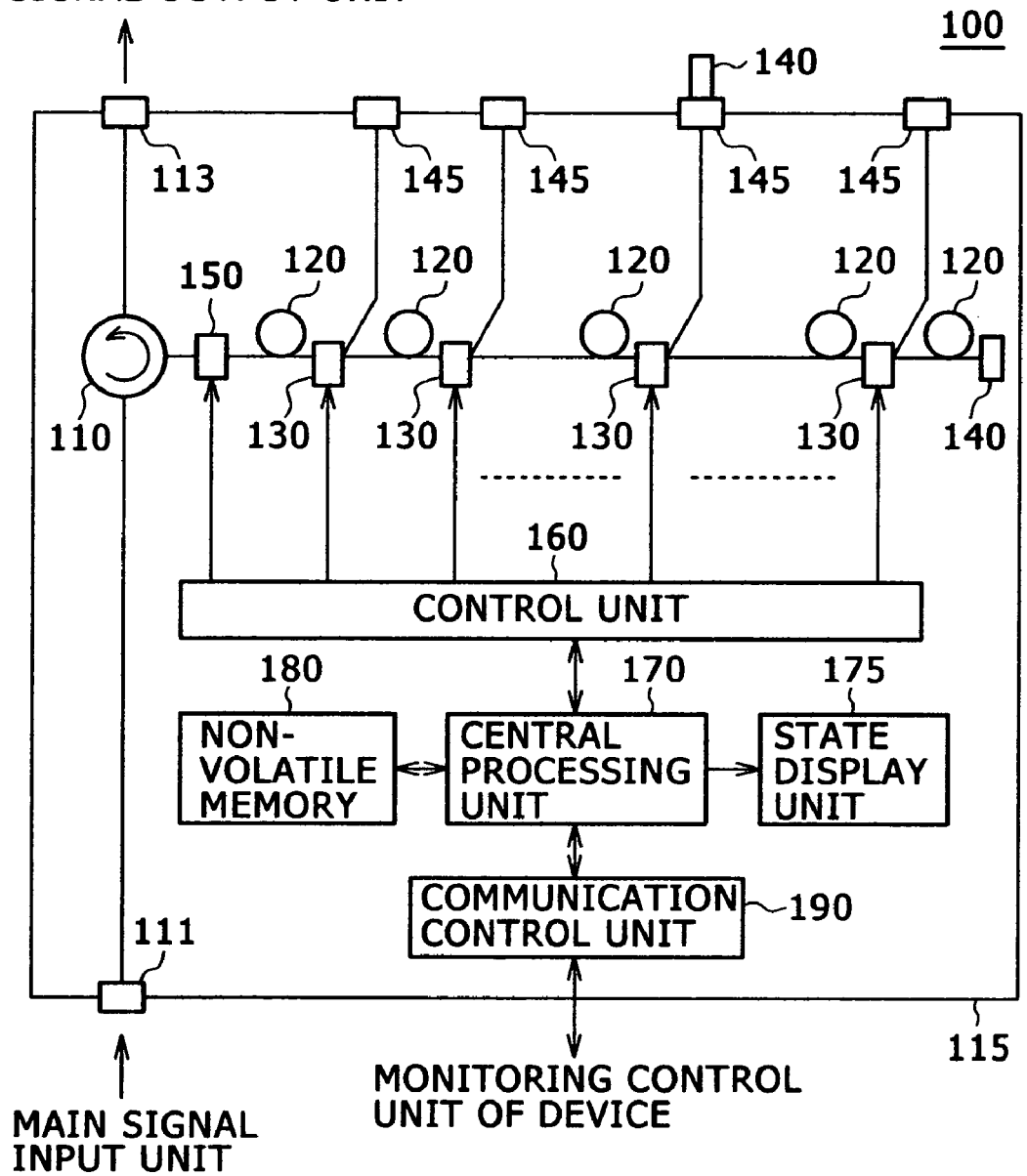
FIG. 7 is a hardware block diagram of the dispersion compensation device, which is another preferred embodiment of the invention.
Figure 8:
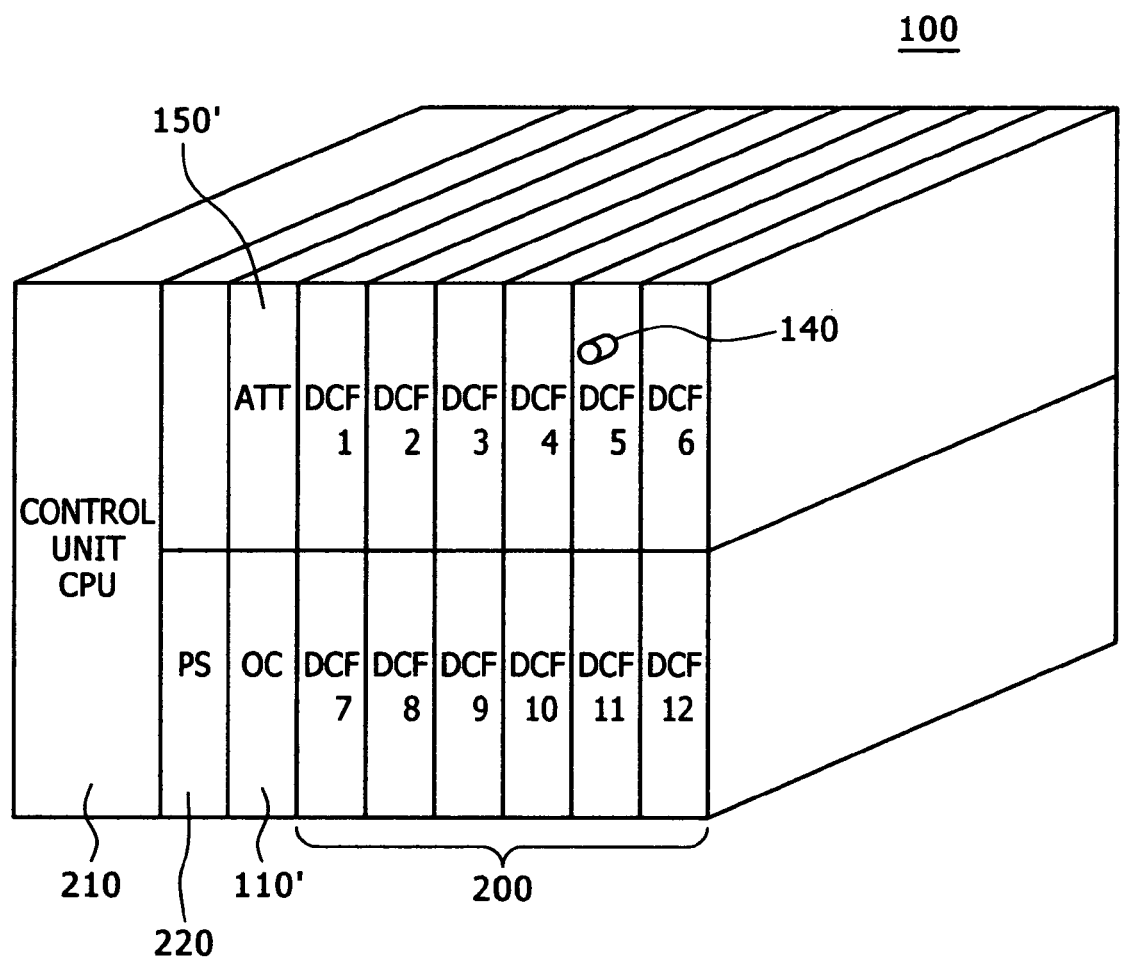
FIG. 8 shows an external view of the dispersion compensation device, which is this other preferred embodiment of the invention.

Preferred embodiments of the present invention will now be described below with reference to the accompanying drawings. Of these drawings, FIGS. 2 illustrate networks to which the invention is to be applied; FIGS. 3 illustrate inter-station transmission systems to which the invention is to be applied; FIGS. 4 illustrate the effects of dispersion compensation; FIG. 5 is a block diagram of a variable dispersion compensation device, which is a preferred embodiment of the invention; FIGS. 6 illustrate the dispersion quantity and fiber length of a dispersion compensation unit in the preferred embodiment of the invention; FIG. 7 is a hardware block diagram of the dispersion compensation device, which is another preferred embodiment of the invention; and FIG. 8 shows an external view of the dispersion compensation device, which is this other preferred embodiment of the invention.

Figure 2A:
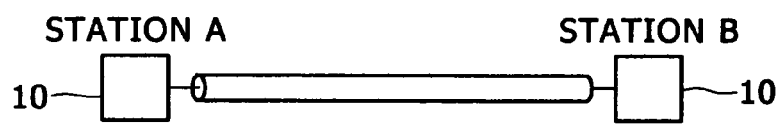
FIGS. 2A–2C illustrate networks to which the invention is to be applied.
Figure 2B:
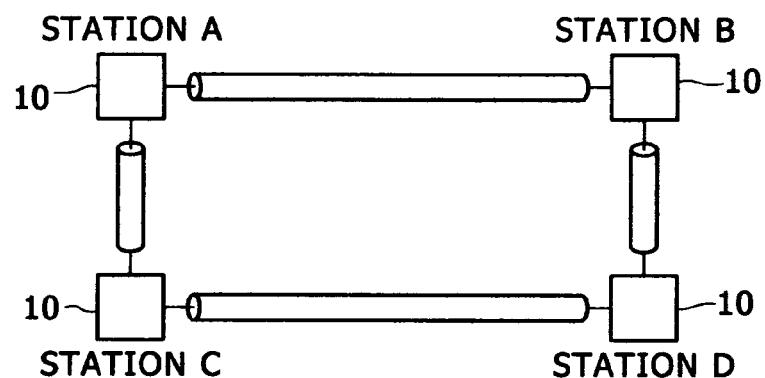
Figure 2C:
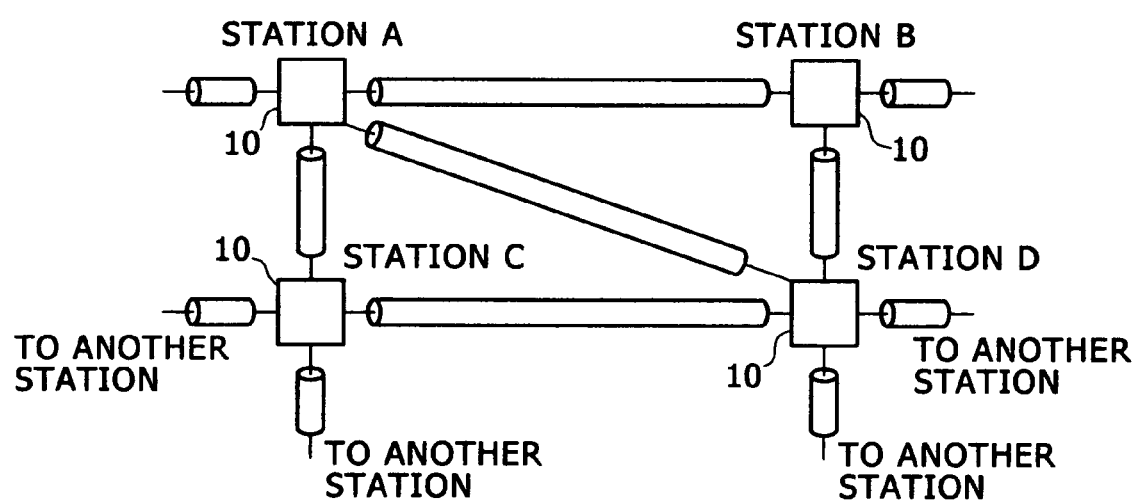

The topology of the network will be described with reference to FIGS. 2. FIG. 2A shows a point-to-point (P-to-P) network linking two terminal stations 10A and 10B by a DSF. FIG. 2B shows a ring network, a typical example of which is SDH. In a ring network, each of a station 10A, a station 10B, a station 10C and a station 10D is linked to immediately adjoining stations by DSFs. Since the network constitutes a ring, even if a fiber runs into a fault in one position, protection can be provided by transmission in the reverse direction. Moreover, the network operation is relatively simple. In a meshed network shown in FIG. 2C, the station 10A, the station 10B, the station 10C, the station 10D and another station (not shown) are connected by DSFs in a mesh shape. A meshed network, though allowing the greatest degree of designing freedom including compatibility with redesigning to match various conditions, is difficult to operate and manage.

A variable dispersion compensation device, which is the preferred embodiment of the invention, is arranged in each station 10 and compensates for any chromatic dispersion arising on an optical fiber transmission line. If any fault occurs on the transmission line directly linking the station 10A and the station 10D as illustrated in FIG. 2C, the transmission line passing the station 10B, for instance, is longer in distance and involves greater chromatic dispersion than the directly linking transmission line in the transparent network referred to above. Even in such a case, a variable dispersion compensation device could respond promptly. The effect of the invention would be particularly significant at a transmission speed of 10 Gbps, 10.7 Gbps or 40 Gbps where the need for dispersion compensation is keener, but the invention can be expected to prove effective at any other transmission speed if the total dispersion quantity, which is determined by the transmission distance and the type of fiber, surpasses the dispersion endurance of the receiver.

Next will be described inter-station transmission systems with reference to FIGS. 3. Though FIGS. 3 depict the P-to-P type shown in FIG. 2A, transmission in this system is equivalent to transmission between any two stations in a ring network or a meshed network.

Figure 3A:
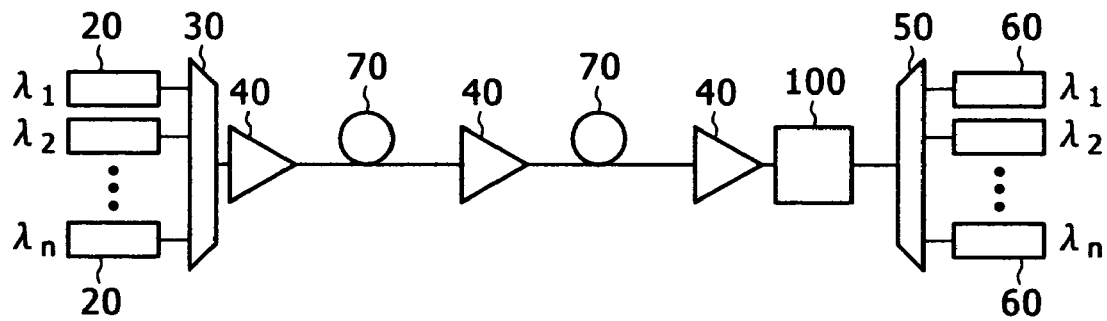
FIGS. 3A–3C illustrate inter-station transmission systems to which the invention is to be applied.

Referring to FIG. 3A, the terminal station on the transmitting side includes n optical transmitters 20, a wavelength multiplexer 30 for wavelength-multiplexing optical signals differing in wavelength ($\lambda 1, \lambda 2, \ldots, \lambda n$) from the optical transmitters 20, and optical amplifiers 40. The terminal station on the receiving side, on the other hand, includes optical amplifiers 40, a variable dispersion compensation device 100, a wavelength demultiplexer 50 for wavelength-demultiplexing wavelength-multiplexed optical signals, and n optical receivers 60. The terminal station on the transmitting side and the terminal station on the receiving side are connected by DSFs 70. About midway on each leg of the DSFs, there is a through node, where an optical amplifier 40 is installed.

Figure 3B:
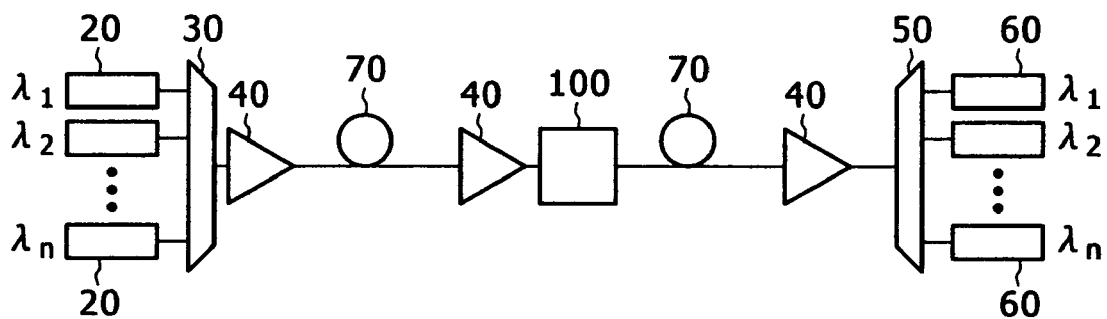
Figure 3C:
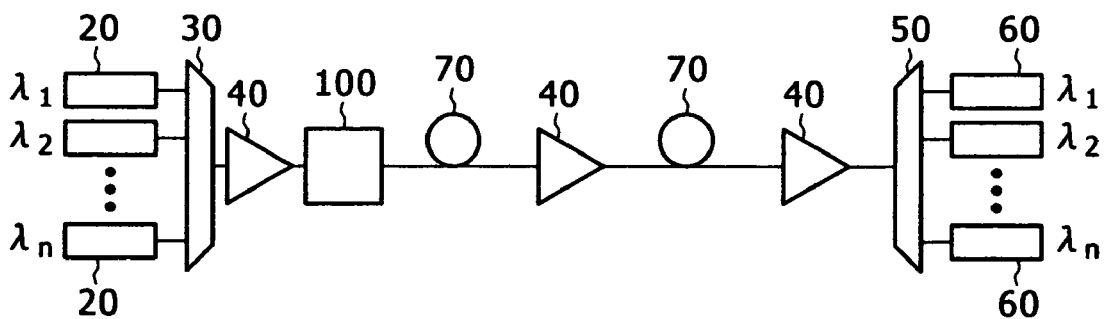

FIGS. 3 illustrate different arrangements of the variable dispersion compensation device within the transmission system. In the configuration of FIG. 3A, it is arranged in the terminal station on the receiving side; in that of FIG. 3B, in the through node; and in that of FIG. 3C, in the terminal station on the transmitting side. Especially the configuration shown in FIG. 3C in which the dispersion compensator is located in the terminal station on the transmitting side, dispersion compensation on the transmission line on which signals are to be transmitted is accomplished in advance. The device may be arranged in any two stations or every station in a disperse way. The positional relationship between the optical amplifier and the dispersion compensator is not limited to this. They may be installed at a prior or posterior stage or even built in.

Chromatic dispersion and dispersion compensation on the transmission line will be described with reference to FIGS. 4. This calculation is made in terms of an SMF. FIG. 4A shows a profile of a transmitted signal, whose waveform is normalized to intensity 1 in the Gaussian distribution. The full-width half-maximum of this waveform is about 40 ps. FIG. 4B shows a waveform after transmission over an SMF of 17 ps/nm/km in chromatic dispersion over a distance of 80 km. The intensity is 0.72, and the full-width half-maximum is about 80 ps. What results from dispersion compensation at −1360 ps/nm (=−17×80 ps/nm) on the waveform of FIG. 4B is the waveform of FIG. 4C.

The variable dispersion compensation device, which is the preferred embodiment of the invention, will now be described with reference to FIG. 5. Referring to FIG. 5, wavelength division-multiplexed main signals are inputted through a port 111 of an optical circulator 110, and outputted from a port 112 of the optical circulator 110. To the port 112 of the optical circulator 110, n dispersion compensation units, each formed of a dispersion compensating fiber 120, a 1×2 optical switch 130 and a mirror 140, are connected in series. Each 1×2 optical switch 130 here has one input; the mirror 140 is connected to one of its outputs, and the input to the dispersion compensation unit of the next stage is connected to the other output. The dispersion compensation unit of the n-th stage has no 1×2 optical switch, but a mirror is directly connected to its dispersion compensating fiber.

Where this configuration is adopted, optical signals are turned back by a mirror at the dispersion compensation unit stage where the mirror has been selected under the control of the 1×2 optical switch, and inputted to the port 112 of the optical circulator 110. The optical signals inputted to the port 112 of the optical circulator 110 are outputted from a port 113 of the optical circulator 110.

Thus, the optical signals, while they are inputted to the port 111 of the optical circulator 110 and outputted from the port 113, twice passes the dispersion compensating fiber of each stage until the stage where the mirror has been selected and undergoes dispersion compensation. Incidentally, where the transmission line is formed of an SMF, the dispersion compensating fiber is a fiber of negative chromatic dispersion. Therefore, simple reference to dispersion compensating fibers would mean fibers of negative chromatic dispersion in the communication wavelength band. Yet the term in the context of this embodiment is not limited to them, but also covers fibers of positive chromatic dispersion in the communication wavelength band.

As the use of commercially available latch type optical switches using permanent magnets or electromagnets as the optical switches here could enable connection to be maintained even in the absence of power supply, power consumption can be saved.

The dispersion quantity and fiber length of each dispersion compensation unit will be described with reference to FIGS. 6. Referring to FIGS. 6, a row 61 for the dispersion quantity of each unit states the dispersion quantity of the dispersion compensating fiber 120 of each dispersion compensation unit. A row 62 for the reference numbers of the optical switches to be switched to the mirror states the 1×2 switch No. of each dispersion compensation unit. A row 63 for the total dispersion compensation quantities in main signal output units states the total dispersion compensation quantities in the optical signals outputted from the ports 113 when the signals are turned back at each dispersion compensation unit. A row 64 for fiber lengths states the lengths of the dispersion compensating fibers. A row 65 for the total fiber lengths states the total fiber length of each dispersion compensation unit when the signals are turned back at the particular dispersion compensation unit. The total fiber length will be described with reference to FIG. 7. The contents of FIGS. 6 are recorded in a nonvolatile memory illustrated in FIG. 7.

FIG. 6A shows a case in which the number of stages of the dispersion compensation units is 5, with a compensation quantity of 500 ps/nm being set for the first dispersion compensation unit 1, and the compensation quantity for each of the dispersion compensation unit 2 through the dispersion compensation unit 5 being reversed in sign, −250 ps/nm in particular. As a result, the range of compensation by the variable dispersion compensation device is from 1000 ps/nm to −1000 ps/nm at 500 ps/mn graduations. According to the invention, achieving the variable range and the graduations of variation stated above requires only two dispersion compensation units, one of 500 ps/nm and the other of −250 ps/nm, and the configuration is thereby simplified.

Figure 1:
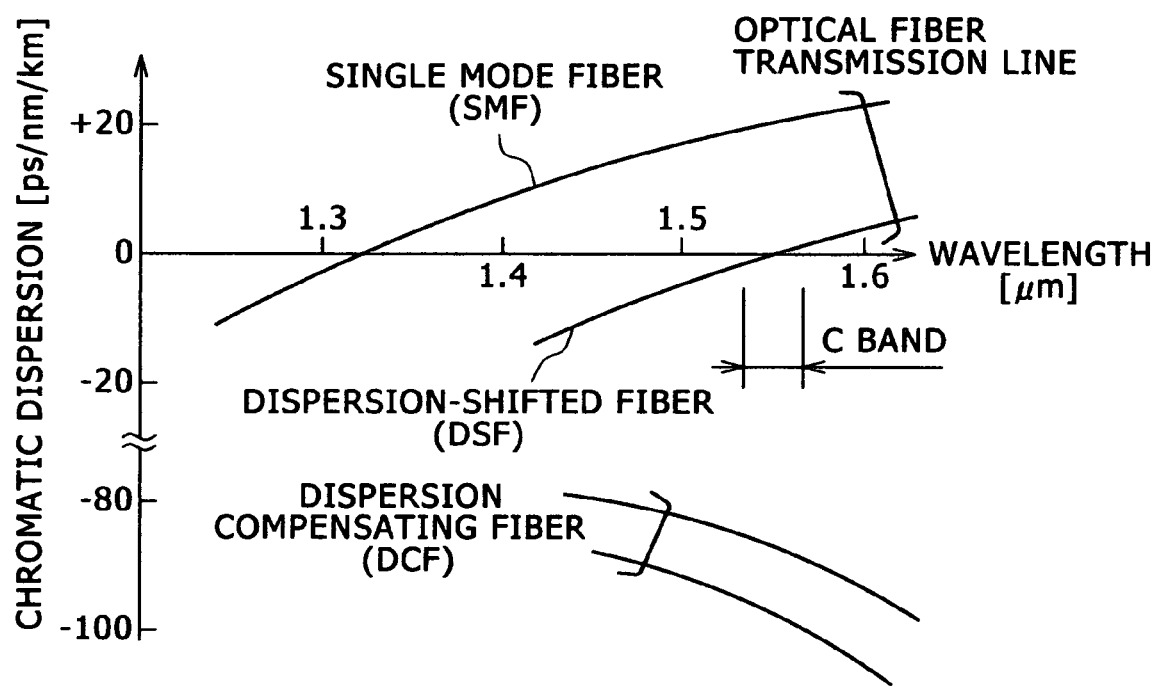
FIG. 1 illustrates the characteristics of various optical fibers relative to the wavelength.

The reason for the plus/minus difference in dispersion compensation quantity between the first dispersion compensation unit and the following dispersion compensation units will be described below. Referring back to FIG. 1, a DSF differs in the required direction of dispersion compensation, positive or negative, with the wavelength in the wavelength band used for communication. In FIG. 6A, in the whole wavelength band, the compensation is once shifted in the positive direction of the y axis, followed by fine adjustment in the negative direction of the y axis. The first dispersion compensation unit is passed again at the final stage after reflection by a mirror. However, the total of the two passages can be regarded as the shift in the positive direction irrespective of the positions in the sequence of dispersion compensation.

Now referring to FIG. 6B, the number of dispersion compensation units is five, with a compensation quantity of −500 ps/nm is set to the first dispersion compensation unit 1 and one of 250 ps/nm to each of dispersion compensation units 2 through 5, reversed to the positive. As a result, the compensation range by the whole variable dispersion compensation device is set between −1000 ps/nm and 1000 ps/nm by 500 ps/nm graduations. In this whole wavelength band, the compensation is once shifted in the negative direction of the y axis, followed by fine adjustment in the positive direction of the y axis. The inclination of the dispersion characteristics of the dispersion compensating fiber here is so selected as to cancel the inclination of the dispersion attributable to the transmission line.

The method of dispersion compensation illustrated in FIGS. 6 by which a dispersion compensation having a large absolute value is first given followed by dispersion compensations of a smaller absolute value each, reverse in plus/minus to the first is not limited to what is shown in FIG. 5 using circulators and mirrors. In the simplest way, two dispersion compensating fibers differing in plus/minus sign may be spliced.

In this embodiment, adjustment is done by about 500 ps/nm graduations, the graduation can be so selected as to achieve a target level of transmission quality, for instance not more than $10^{-12}$ in bit error rate.

The dispersion compensation device and its hardware will be described with reference to FIG. 7. The same parts as in the configuration of FIG. 5 will be denoted by respectively the same reference signs, and their description will be dispensed with.

Referring to FIG. 7, optical signals inputted to the port 111, after going through dispersion compensation, are outputted from the port 113. While each dispersion compensation unit contains a mirror in the configuration of FIG. 5, this embodiment has mirror ports 145 disposed on a case 115, and the mirror 140 is inserted into each mirror port 145 from outside the case. When the mirror 140 is not inserted into the mirror port 145, the latter is covered with a dustproof lid. This makes it possible to know at a glance which of the last dispersion compensation units optical signals have reached. Incidentally, only the dispersion compensation unit of the final stage, having no switch, has the mirror 140 in the case 115. However, the dispersion compensation unit of the final stage may also have a mirror port on the case.

In the configuration shown in FIG. 7, a variable attenuator 150 is disposed between the optical circulator 110 and the dispersion compensation unit of the first stage. This is intended not only to vary the dispersion compensation quantity but also to keep the quantity of signal loss, which varies at the same time, constant in the position of the port 113. More specifically, the attenuation quantity of the variable attenuator 150 is so adjusted as to cancel variations of the total fiber length shown in FIG. 6.

The variable attenuator 150 and the plural 1×2 optical switches 130 are controlled by a control unit 160. The dispersion quantity and the attenuation quantity of each dispersion compensation unit are recorded in a nonvolatile memory 180, and a central processing unit 170 computes the total dispersion quantity by referencing the nonvolatile memory 180 and instructs the control unit 160 to change over optical switches and the variable attenuator 150 to set an attenuation quantity. The state of dispersion quantity adjustment is displayed on a stated is play unit 175. A communication control unit 190 delivers to the central processing unit 170 instructions from a superior monitoring and control unit for the device.

The plural 1×2 optical switches 130 select a normal contact (output selected when no electric power is supplied) for the dispersion compensating module of the next stage. This makes it possible to supply power only to the 1×2 optical switch which causes optical signals to be turned back by the mirror 140 out of the plural 1×2 optical switches 130. Therefore, the optical components to which power is to be supplied are limited to the variable attenuator 150 and a maximum of one 1×2 optical switch, enabling power consumption to be saved.

The packaging of the variable dispersion compensation device will now be described with reference to FIG. 8. In order to be accommodable by a standard 19×25.4 mm rack, the variable dispersion compensation device 100 includes twelve 5.4-mm rack dispersion compensation units 200 of 25 mm (w)×85 mm (h), one each of variable attenuator module 150', optical circulator unit 110' and power supply unit 220 all of the same external shape as the units 200, and a control unit 210 accommodating a control unit, a central processing unit and so forth. In this variable dispersion compensation device, the mirror 140 is inserted into the fifth dispersion compensation unit. In this state the optical switch in the dispersion compensation unit is changed over to the mirror 140 side. The electrical connector and the optical connector of each unit are connected to receptacles disposed on the back wiring board on the rear side of the device. Therefore, the sixth and subsequent dispersion compensation units 200 can be inserted or withdrawn at any time without affecting main signals. For this reason, when the routing of the transmission line is to altered, the change to an appropriate dispersion compensation unit can be done in advance, which facilitates remote control.

Incidentally in FIG. 5 and FIG. 7, no 1×2 optical switch is illustrated for the dispersion compensation unit of the final stage, but a mirror is provided. However, to make the interface the same as others, the mirror of the final stage not shown in mounted on the back wiring board side.

These embodiments of the invention can provide variable dispersion compensation devices to compensate for chromatic dispersion of wavelength division-multiplexed optical signals attributable to a DSF transmission line.

Mirrors are provided on the front face of the case to make it possible to know at a glance which, out of the plural dispersion compensation units, was used last. There is a further advantage that any dispersion compensation unit not in use, including the optical switch, can be withdrawn, or an additional one provided, as desired.

The variable attenuator provides a benefit of restraining the loss to a certain level when the dispersion compensation quantity is to be altered.

Since the dispersion compensating fibers are passed two ways, the length of dispersion compensating fibers can be reduced to half of their number used in the conventional way.

What is claimed is:

1. A dispersion compensation device which compensates wavelength dispersion of input light signal and outputs compensated light signal, comprising:
   an optical circulator which has a first, a second and a third ports, outputs input optical signal from the first port to the second port and outputs input optical signal from the second port to the third port;
   a first and a second dispersion compensation units, including:
      a dispersion compensating fiber which compensates wavelength dispersion of light signal that passes therethrough,
      an optical path setting unit which has a first, a second and a third input/output ports and sets optical path for light signal between the first input/output port connecting to an end of the dispersion compensating fiber and the second input/output port or the third input/output port, and
      an optical reflecting unit which is connected to the third input/output port of the optical path setting unit;
   a control unit which controls said optical path setting units of the first and second dispersion compensation units; and
   wherein the other end of the dispersion compensating fiber of the first dispersion compensation unit connects to the second port of the optical circulator,
   wherein the other end of the dispersion compensating fiber of the second dispersion compensation unit connects to the second input/output port of the optical path setting unit of the first dispersion compensation unit,
   wherein in case said control unit controls to connect the first input/output port and the third input/output port of the optical path setting unit of the first dispersion compensation unit, said optical reflecting unit of the first dispersion compensation unit reflects optical signal and an optical signal input to the optical circulator is dispersion compensated by the dispersion compensating fiber of the first dispersion compensation unit and is output from the third port of the optical circulator, and
   wherein in case said control unit controls to connect the first input/output port and the second input/output port of the optical path setting unit of the first dispersion compensation unit and controls to connect the first input/output port and the third input/output port of the optical path setting unit of the second dispersion compensation unit, said optical reflecting unit of the second dispersion compensation unit reflects optical signal and an optical signal input to the optical circulator is dispersion compensated by the dispersion compensating fibers of the first and second dispersion compensation units and is output from the third port of the optical circulator.

2. A dispersion compensation device, according to claim 1, wherein:
   a wavelength dispersion characteristic of the dispersion compensating fiber of the first dispersion compensation unit and a wavelength dispersion characteristic of the dispersion compensating fiber of the second dispersion compensation unit are different in plus/minus.

3. A dispersion compensation device, according to claim 1, wherein:
   a first absolute dispersion compensating value of the dispersion compensating fiber of the first dispersion compensation unit is greater than a second absolute dispersion compensating value of the dispersion compensating fiber of the second dispersion compensation unit.

4. A dispersion compensation device, according to claim 1, wherein:
   said optical path setting unit is an optical switch.

5. A dispersion compensation device, according to claim 4, wherein:
   said optical switch has 1×2 input/output ports.

6. A dispersion compensation device, according to claim 1, wherein:
   said optical reflecting unit is a mirror.

7. A dispersion compensation device, according to claim 1, wherein:
   said dispersion compensation device is able to increase a number of the dispersion compensating fibers by connecting another dispersion compensation unit to the second dispersion compensation unit in series.

8. A dispersion compensation device, according to claim 1, wherein:
   at least one of the third input/output ports of the optical path setting units of the first and the second dispersion compensation units is not connected to the optical reflecting unit.

* * * * *